US012668093B2

(12) United States Patent
Pierres et al.

(10) Patent No.: US 12,668,093 B2
(45) Date of Patent: Jun. 30, 2026

(54) HEATING, VENTILATION AND/OR AIR-CONDITIONING DEVICE FOR A MOTOR VEHICLE

(71) Applicant: Valeo Systemes Thermiques, Le Mesnil Saint-Denis (FR)

(72) Inventors: Philippe Pierres, Le Mesnil Saint-Denis (FR); Thierry Barbier, Le Mesnil Saint-Denis (FR); Cédric Van Schammelhout, Le Mesnil Saint-Denis (FR); Nestor Varela, Le Mesnil Saint-Denis (FR); Naveenkumar Ummidi, Chennai (IN)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 99 days.

(21) Appl. No.: 17/429,234

(22) PCT Filed: Feb. 5, 2020

(86) PCT No.: PCT/FR2020/050201
§ 371 (c)(1),
(2) Date: Aug. 6, 2021

(87) PCT Pub. No.: WO2020/161439
PCT Pub. Date: Aug. 13, 2020

(65) Prior Publication Data
US 2022/0134836 A1 May 5, 2022

(30) Foreign Application Priority Data

Feb. 7, 2019 (FR) ........................................ 1901216
Feb. 7, 2019 (FR) ........................................ 1901217

(51) Int. Cl.
*B60H 1/00* (2006.01)

(52) U.S. Cl.
CPC ..... *B60H 1/00064* (2013.01); *B60H 1/00028* (2013.01); *B60H 2001/00092* (2013.01); *B60H 2001/00107* (2013.01)

(58) Field of Classification Search
CPC ...... B60H 1/00064; B60H 2001/00092; B60H 2001/00107; B60H 1/00678; B60H 1/00685; B60H 1/00692
See application file for complete search history.

(56) References Cited

U.S. PATENT DOCUMENTS 6,305,462 B1 * 10/2001 Tsurushima ....... B60H 1/00692
454/126
7,481,703 B2 * 1/2009 Okumura ........... B60H 1/00514
454/126
(Continued)

FOREIGN PATENT DOCUMENTS

CN 101856962 A 10/2010
CN 101963376 A 2/2011
(Continued)

OTHER PUBLICATIONS

FR 3054489 A1 English machine translation (Year: 2018).*
(Continued)

*Primary Examiner* — Jenna M Maroney
(74) *Attorney, Agent, or Firm* — Osha Bergman Watanabe & Burton LLP

(57) ABSTRACT

A heating, ventilation, and/or air-conditioning device for a motor vehicle includes a housing defining a flow channel for an air flow, in which are arranged a first heat exchanger and a second heat exchanger. The first and the second heat exchangers are inscribed in substantially orthogonal planes. The heating device includes a bypass path of the second heat exchanger and a plurality of air outlet ducts, each air outlet duct being configured to guide the air flow toward different regions of a vehicle passenger compartment. A mixing flap
(Continued)

including a sliding door is arranged in the flow channel so as to be able to close the bypass path and/or the second heat exchanger and a second distribution flap including a sliding door is arranged so as to be able to at least partially close a first of said plurality of air outlet ducts.

8 Claims, 2 Drawing Sheets

(56) References Cited

U.S. PATENT DOCUMENTS

| | | | | |
|---|---|---|---|---|
| 7,540,321 | B2 * | 6/2009 | Simmet | B60H 1/0005 |
| | | | | 454/126 |
| 2018/0105015 | A1 * | 4/2018 | Haupt | B60H 1/00028 |
| 2018/0272833 | A1 * | 9/2018 | Lee | B60H 1/00692 |
| 2022/0297502 | A1 * | 9/2022 | Pierres | B60H 1/00564 |

FOREIGN PATENT DOCUMENTS

| | | | | | |
|---|---|---|---|---|---|
| CN | 103826889 | A | | 5/2014 | |
| CN | 104002636 | A * | 8/2014 | | B60H 1/0005 |
| CN | 106457966 | A | | 2/2017 | |
| CN | 113646196 | A * | 11/2021 | | B60H 1/00064 |
| CN | 115066345 | A * | 9/2022 | | B60H 1/00535 |
| CN | 115380155 | A * | 11/2022 | | B60H 1/00028 |
| DE | 10313565 | A1 | | 10/2003 | |
| DE | 10334500 | B4 * | 4/2006 | | B60H 1/00064 |
| DE | 112014004822 | T5 * | 7/2016 | | B60H 1/00028 |
| EP | 1040946 | A2 * | 10/2000 | | B60H 1/00064 |
| EP | 1241032 | A2 * | 9/2002 | | B60H 1/0005 |
| EP | 1557307 | A2 * | 7/2005 | | B60H 1/00064 |
| EP | 1634735 | A1 * | 3/2006 | | B60H 1/00064 |
| EP | 2048009 | A1 | | 4/2009 | |
| EP | 3170687 | A1 * | 5/2017 | | B60H 1/00678 |
| FR | 3038547 | A1 * | 1/2017 | | B60H 1/00064 |
| FR | 3054488 | A1 * | 2/2018 | | B60H 1/00028 |
| FR | 3054489 | A1 * | 2/2018 | | |
| FR | 3054490 | A1 * | 2/2018 | | B60H 1/00028 |
| FR | 3058361 | A1 | | 5/2018 | |
| FR | 3092524 | A1 * | 8/2020 | | B60H 1/00064 |
| FR | 3092525 | A1 * | 8/2020 | | B60H 1/00064 |
| JP | 4084894 | B2 * | 4/2008 | | |
| WO | WO-2018020106 | A1 * | 2/2018 | | B60H 1/00064 |
| WO | WO-2020161439 | A1 * | 8/2020 | | B60H 1/00064 |
| WO | WO-2021038153 | A1 * | 3/2021 | | B60H 1/00692 |
| WO | WO-2021038154 | A1 * | 3/2021 | | B60H 1/00457 |
| WO | WO-2022207837 | A1 * | 10/2022 | | |

OTHER PUBLICATIONS

FR-3038547-A1 English Machine Translation (Year: 2017).*

International Search Report and Written Opinion issued in corresponding International Patent Application No. PCT/FR2020/050201, mailed on Jun. 5, 2020 (10 pages).

Office Action issued in Corresponding CN Application No. 202080026859.3, dated Nov. 29, 2023. (13 Pages with English Translation).

* cited by examiner

HEATING, VENTILATION AND/OR AIR-CONDITIONING DEVICE FOR A MOTOR VEHICLE

The invention relates to the field of heating, ventilation and/or air-conditioning devices for a motor vehicle and also to a motor vehicle comprising such a device.

A motor vehicle is commonly equipped with a ventilation, heating and/or air-conditioning device to regulate the aerothermal parameters of an air flow distributed toward the interior of the vehicle passenger compartment. The device generally comprises a housing demarcated by partitions, in which openings are provided, including at least one air inlet and at least one air outlet.

In a known manner, the housing houses a blower to circulate the air flow from the air inlet to the air outlet. The housing also houses heat treatment means for heating and/or cooling the air flow prior to its distribution inside the passenger compartment. By way of example, the heat treatment means may comprise an evaporator which is intended to cool and dehumidify the flow of air passing through it, as well as a radiator, possibly associated with an additional radiator, which is intended to heat the flow of air flowing through it.

It is known, in these devices, to have an evaporator disposed downstream of the air inlet, so that all of the air flow entering inside the housing is dehumidified by the evaporator. Then, the flow of cold air thus generated is admitted into a main mixing chamber and/or directed toward a heating member, in particular a radiator and possibly an additional radiator, to obtain a flow of hot air. The main mixing chamber is used to mix one or more cold and/or hot air flows so that the air flow from the mixture, having the desired setpoint temperature, is distributed toward specific zones of the passenger compartment of the motor vehicle. The main mixing chamber is provided with at least one mixing member in order to define the proportion of the flow of cold air and of the flow of hot air from the heating chamber entering the main mixing chamber. This member thus makes it possible to adjust the temperature of the mixed air flow intended to be distributed in the dedicated zone(s) of the passenger compartment, such as for example the front and rear zones, or left and right zones, in the passenger compartment of the motor vehicle.

Although such a heating, ventilation and/or air-conditioning device makes it possible to carry out ventilation management for several zones of the vehicle, there are, however, many constraints in terms of volume and weight for these devices. In fact, the heating, ventilation and/or air conditioning devices are generally placed under the dashboard of the motor vehicle, this implying the raising of the dashboards thus limiting the visibility of the driver.

The present invention aims to optimize the vertical steric bulk of a heating, ventilation and/or air-conditioning device.

For this, the invention provides a heating, ventilation and/or air-conditioning device for a motor vehicle, comprising a housing defining a flow channel for an air flow, in which are arranged a first heat exchanger, a second heat exchanger, the first and the second heat exchangers being inscribed in substantially orthogonal planes, and more particularly in orthogonal planes, a bypass path of the second heat exchanger and at least one air outlet duct, each air outlet duct being configured to guide the air flow in particular toward different regions of a vehicle passenger compartment, characterized in that a mixing flap comprising a sliding door is arranged in the flow channel so as to be able to close the bypass path and/or the second heat exchanger and a second distribution flap comprising a sliding door is arranged so as to be able to at least partially close off a first of said air outlet ducts.

In this way, the invention makes it possible to have a heating, ventilation and/or air-conditioning device that is less bulky than those of the prior art. Indeed, the fact of arranging two flaps comprising sliding doors at different locations of the heating, ventilation and/or air-conditioning device makes it possible to optimally limit the height of said device.

Particular embodiments according to the invention propose that:

a. the second distribution flap is arranged so as to be able to close the outlet air duct configured to guide the air flow toward a ventilation nozzle;

b. a first distribution flap comprising a flag-type flap is arranged so as to be able to at least partially close a second of said air outlet ducts;

c. the second air outlet duct is configured to guide an air flow toward a nozzle intended to open into the passenger compartment at the level of the feet of the vehicle passengers;

d. a third distribution flap comprising a butterfly-type flap is arranged so as to be able to at least partially close a third of said air outlet ducts;

e. the third air outlet duct is configured to guide an air flow toward the defrost nozzle;

f. the first and second heat exchangers form an angle within a range of 40° to 120;

g. the air outlet duct is defined on the one hand by a wall of the housing defining the flow channel and on the other hand by another external wall arranged outside the flow channel;

h. the nozzle is arranged below the first heat exchanger with respect to the vertical axis Z;

i. the housing comprises an air inlet and said air outlet duct is arranged on the part of the box opposite to said air inlet;

j. the housing is of elongate shape and in which a blower, the first and the second heat exchangers are aligned in a transverse axis of said housing, the first and the second heat exchangers being aligned in a longitudinal axis of said housing.

The invention also relates to a motor vehicle comprising a heating, ventilation and/or air-conditioning device as described above.

One aspect according to the invention provides that the second heat exchanger is arranged substantially horizontal with respect to the vehicle in the mounted state and that the first heat exchanger is arranged substantially vertical with respect to the vehicle in the mounted state.

Further features and advantages of the invention will become apparent from reading the following description, with reference to the attached figures, in which.

The following embodiments are examples. Although the description refers to one or more embodiments, this does not necessarily mean that each reference relates to the same embodiment, or that the features apply only to a single embodiment. Individual features of different embodiments can also be combined or interchanged in order to create other embodiments.

The terms "upstream" and "downstream" are always in reference with respect to the flow of an air flow circulating within the heating, ventilation and/or air-conditioning device.

Figure 1:
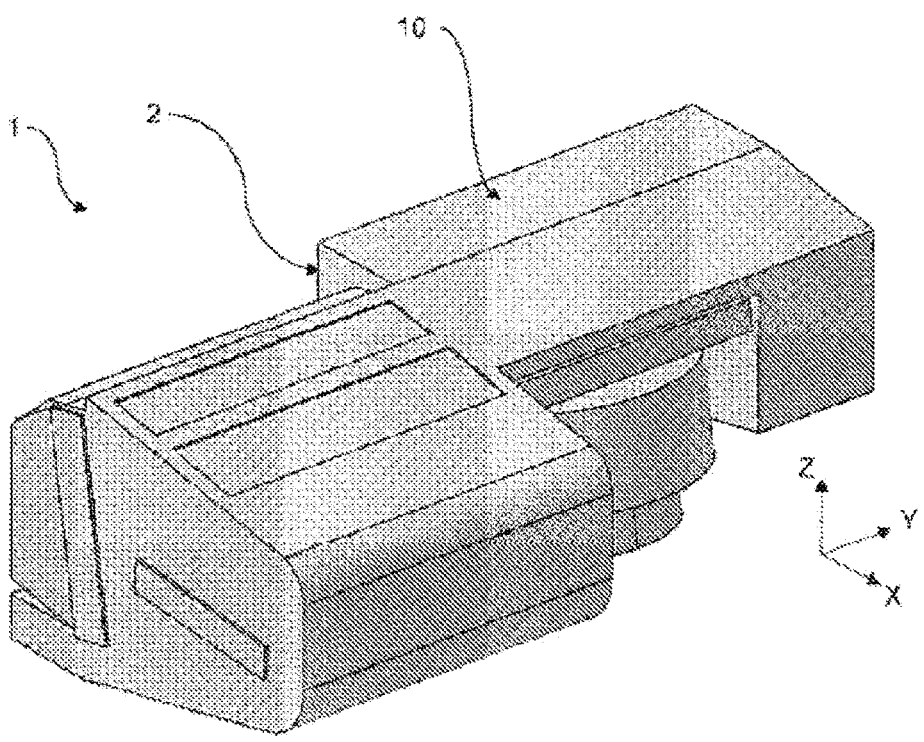
FIG. 1 illustrates a perspective view of the heating, ventilation and/or air-conditioning device according to the invention.
Figure 2:
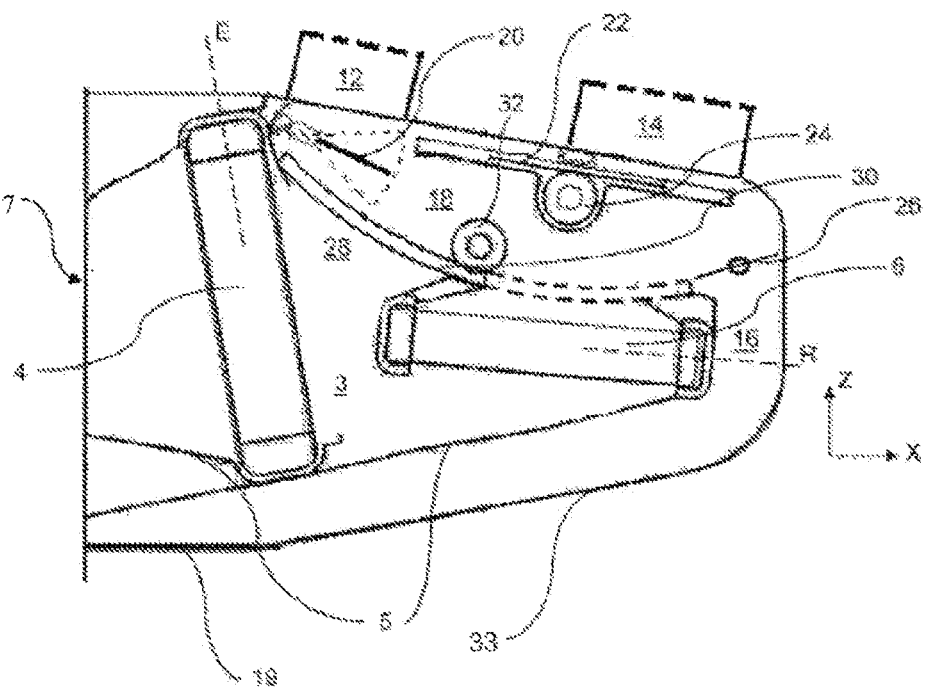
FIG. 2 illustrates a profile view of part of the heating, ventilation and/or air-conditioning device according to the invention.

In [FIG. 1] and [FIG. 2] there is shown schematically an XYZ trihedron where a longitudinal axis X of the heating, ventilation and/or air-conditioning device 1 may correspond to the front/rear longitudinal axis of the vehicle. A transverse axis Y of the heating, ventilation and/or air conditioning device 1 may correspond to the right/left transverse axis of the vehicle, and a vertical axis Z of the heating, ventilation and/or air-conditioning device 1 may correspond to the top/bottom vertical axis of the vehicle, each axis being perpendicular to one another in particular when the heating, ventilation and/or air-conditioning device 1 is installed in the motor vehicle.

To obtain a heating, ventilation and/or air-conditioning device with a small vertical steric bulk, the invention as illustrated in [FIG. 1], the invention provides a heating, ventilation and/or air-conditioning device 1 comprising a housing 2 of elongate shape defining a flow channel for an air flow intended to be distributed in the passenger compartment in which are housed means of heat treatment of the air flow. In other words, as illustrated in [FIG. 2], the housing 2 defines, by means of walls 5, a flow channel 3, or a flow duct, for conveying an air flow from an air inlet to an air outlet.

The heat treatment means comprise a first heat exchanger 4, for example an evaporator, intended to cool and dehumidify the entire air flow circulating in the flow channel 3.

The heat treatment means also include a second heat exchanger 6, for example a radiator, intended to heat part of the air flow circulating in the heating, ventilation and/or air-conditioning device 1, and is arranged downstream, relative to the flow of the air flow, from the first heat exchanger 4. The second heat exchanger 6 can optionally be coupled to an additional electric radiator intended to heat the air flow more quickly, in particular when starting the vehicle.

Figure 3:
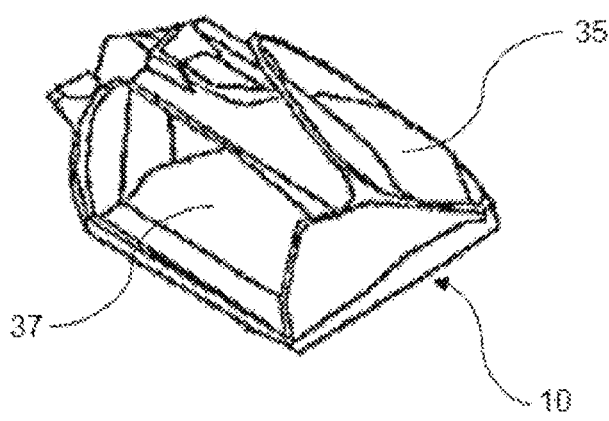
FIG. 3 illustrates a perspective view of part of the heating, ventilation and/or air-conditioning device.

The air flow is introduced into the housing 2 via at least one air inlet 10 and then is directed via a blower which comprises for this a motor and a paddle wheel. The blower routes the air flow from the air inlet 10 to at least one outlet, after having been heat-treated by the heat exchangers 4, 6. The air inlet 10 corresponds to an air inlet housing comprising two openings, an outside air inlet 35 and a recycling air inlet 37 as illustrated in [FIG. 3]. A flap can be arranged between the two openings to at least partially close each one. The air inlet 10 is arranged on the upper part with respect to the vertical axis Z of the heating, ventilation and/or air-conditioning device.

The outlet comprises several outlet ducts illustrated in [FIG. 2] distributing the air flows to nozzles opening into different regions of the passenger compartment. Each air outlet duct comprises a mouth corresponding to the inlet of the air outlet duct. The outlet comprises in particular a first air outlet duct 12 configured to lead the air flow toward the defrost nozzle thus making it possible to demist the windshield. The outlet further comprises a second air outlet duct 14 capable of bringing the air flow to the side/central ventilation nozzle, thus making it possible to cool/heat the passengers of the vehicle. Finally, the outlet comprises a third air outlet duct 16 directing the air flow toward the feet nozzle making it possible to cool/heat the feet of the front passengers of the vehicle. As illustrated in [FIG. 2], the inlets of two outlet ducts 12,14 capable of leading the air flow toward the ventilation and defrosting nozzles are coplanar. In other words, the inlets of these two ducts 12, 14 are inscribed in the same plane.

The third air outlet duct 16 has a particular shape where the third air outlet duct 16 runs along the flow channel 3 in the lower part, with respect to the vertical axis Z of the heating, ventilation and/or air-conditioning device 1. It can also be said that the third air outlet duct 16 is arranged on the part of the housing 2 opposite to the air inlet 10, or that the third air outlet duct 16 runs along the lower or outer surface of the housing 2 of the heating, ventilation and/or air-conditioning device 1, more precisely the third air outlet duct 16 runs along the lower surface of the wall 5 of the housing 2 defining the flow channel 3. The wall 5 comprises an internal surface defining an internal volume corresponding to the flow channel 3 and an external surface arranged outside the flow channel 3, the third air outlet duct 16 runs along the external surface of said wall 5. As illustrated in [FIG. 2], the third air outlet duct 16 extends from a mixing chamber 18, which will be described later, to a nozzle 19, corresponding to the outlet of said third air outlet duct 16, opening into the feet zone of the passenger compartment. Said nozzle 19 is arranged below the first heat exchanger 4 with respect to the vertical axis Z. In other words, the third air outlet duct 16 comprises an inlet mouth arranged at the level of the mixing chamber 18, said third air outlet duct 16 then extends along the walls 5 of the housing 2, it can also be said that the third air outlet duct 16 is juxtaposed, or secured, to the wall 5 of the housing 2 so as to convey the air flow in one direction substantially opposite to the direction of the air flow passing through the first heat exchanger 4, finally said third air outlet duct 16 brings the air flow to a nozzle 19 arranged below the evaporator 4. It can also be said that the third air outlet duct 16 directs the air flow from the mixing chamber 18 to the bulkhead 7, or the firewall, of the vehicle. It is also possible to define the third air outlet duct 16 as conveying the air flow from the mixing chamber to the part of the housing 2 opposite the mixing chamber 18, or to the wall of the housing 2 where the air inlet 10 is arranged. It will thus be understood that the third air outlet duct 16 is defined on the one hand by a wall 5 of the housing 2 defining the flow channel 3 and on the other hand by another external wall 33 arranged outside the flow channel 3. The flow channel 3 is defined here by the walls 5 of the housing 2 and extends from the air inlet 10 to the mixing chamber 18 inclusive. The nozzle 19 of the third air outlet duct 16 and the first heat exchanger 4 are inscribed in the same transverse Y and longitudinal X planes and are offset with respect to the vertical axis Z of the heating, ventilation and/or air-conditioning device 1. It can also be said that the nozzle 19 is arranged below the evaporator with respect to the direction of extension of the evaporator 4. For this, the air outlet duct 16 comprises at least one bend.

Obviously, the invention is not limited to this precise embodiment. The nozzle 19 of the third air outlet duct 16 and the first heat exchanger 4 are inscribed in close transverse Y and longitudinal X planes and are offset with respect to the vertical axis Z of the heating, ventilation and/or air-conditioning device 1 as illustrated in [FIG. 2]. The term "close" is understood to mean that the evaporator 4 and the nozzle 19 of the third outlet duct 16 are both arranged in the same half, in particular the same quarter, of the heating, ventilation and/or air-conditioning device 1 along the longitudinal axis X.

A distribution flap is arranged at each mouth, or inlet, of the air outlet ducts 12, 14, 16. Each distribution flap is configured to go from a configuration where it completely closes each air outlet duct inlet to a configuration where it allows the air flow to circulate entirely within the corresponding first, second, or third air outlet duct 12, 14, 16. Obviously, each distribution flap is able to adopt any intermediate position.

A first flag-type distribution flap 20, corresponding to a door with a rotation shaft arranged at one of the ends of the door, is arranged at the inlet of the first air outlet duct 12. A second distribution flap 22 of the sliding type, corresponding to a sliding door on which is arranged at least one rack. In order to set the second distribution flap 22 in motion, at least one gear 24 complementary to the rack is rotated about an axis by an actuator (not shown). The rotation of the gear 24 drives the translational movement of the sliding door between two end positions, a first end position where the second distribution flap 22 closes the inlet mouth of the second air outlet duct 14 and a second end position where the second distribution flap 22 allows the flow of cold air from the mixing chamber 18 to access within the second air outlet duct 14. A third butterfly distribution flap 26, corresponding to a flap with a rotation shaft and one or two blades arranged on either side of the rotation shaft, is arranged at the inlet of the third air outlet duct 16 and makes it possible to optionally close the third air outlet duct 16.

The first heat exchanger 4 comprises two collecting chambers and a heat bundle comprising a set of tubes or plates and it is considered here that the heat bundle defines a plane E. The second heat exchanger 6 comprises two collecting chambers and a heat bundle comprising a set of tubes or plates and it is considered here that the heat bundle defines a plane R.

In order to gain height, the second heat exchanger 6 is inscribed in a plane R which is orthogonal to the plane P of the air inlet of the volute. In other words, the second heat exchanger 6 is inscribed in a plane R substantially parallel to the axis of rotation of the blower. With reference to the vehicle, the plane E of the first heat exchanger 4 corresponds substantially to the plane defined by the transverse and vertical axes YZ of the vehicle, while the plane R of the second heat exchanger 6 corresponds substantially to the plane defined by the longitudinal and transverse axes XY of the vehicle. In other words, the second heat exchanger 6 is arranged substantially horizontally with respect to the heating, ventilation and/or air-conditioning device 1 or even with respect to the vehicle once in the installed state. This therefore allows a considerable gain in height.

In order to limit the steric constraints even more, the angle between the plane E of the first heat exchanger 4 and the plane R of the second heat exchanger 6 is included in a range going from [40° to 120°] According to a particular embodiment, the first and second heat exchangers 4,6 are inscribed in substantially orthogonal planes, and more particularly in orthogonal planes.

According to the invention, the device 1 comprises an evacuation duct making it possible to guide the condensates toward the outside of the housing 2. In order to reduce the height of the device, the evacuation duct is of flattened shape and extends in a direction substantially parallel to the plane R of the second heat exchanger 6. In other words, the evacuation duct has a flow channel having a section of oblong shape, as illustrated here, or any other shape whose width exceeds the height, such as an elliptical or rectangular shape, etc.

The air flow entering within the housing is conveyed from the air inlet 10 through a volute corresponding to a part of the spiral housing. The volute has an air inlet corresponding to an orifice present within the spiral housing, also called casing. The volute presents a radial evolution starting from the nose of the volute, over an angle range which can go from 0° to 360°. The volute then has a volute outlet having the shape of a rectilinear duct so that the air flow leaving the volute follows this same shape. The air flow then opens into a part called the divergent which corresponds to a part of the rectilinear flow channel 3 having an enlargement in height along the axis Z. The air flow flows through the divergent up to the first heat exchanger 4.

Once the air flow has been cooled by the first heat exchanger 4, it is guided within the flow channel 3 toward the second heat exchanger 6. According to the embodiment illustrated in [FIG. 2], to ensure that the flow of cold air from the first heat exchanger 4 is not thermally contaminated by the second heat exchanger 6, the device 1 comprises a bypass path 28 of the second heat exchanger 6. Thus, the flow of cold air, having passed through the first heat exchanger 4, circulates either through the second heat exchanger 6 to be heated, or bypasses the second heat exchanger 6 via the bypass path 28 in order to maintain its low temperature.

The hot and cold air flows are then directed in the direction of a mixing chamber 18 to be mixed there and distributed to the mouths, or inlets, of the outlet ducts 12,14,16 at the set temperatures. To achieve this mixing in variable proportions, the device 1 comprises a mixing flap 30 making it possible to regulate the proportion of cold air flow passing through the second heat exchanger 6 and the proportion of cold air flow passing through the bypass path 28.

The mixing flap 30 corresponds to a flap of the sliding type, that is to say it comprises a sliding door on which is arranged at least one rack. In order to set the mixing flap 30 in motion, at least one gear 32 complementary to the rack is rotated about an axis by an actuator (not shown). The rotation of the gear 32 drives the translational movement of the sliding door between two end positions, a first end position where the mixing flap completely closes the bypass path 28 of the second heat exchanger 6 and a second end position where the mixing flap 30 closes the air passage downstream of the second heat exchanger 6 so that the air flow having passed through the second heat exchanger 6 cannot access the mixing chamber 18.

The mixing flap 30 as illustrated in [FIG. 2] is arranged downstream of the second heat exchanger 6; however, that can be arranged between the first and the second heat exchanger 4,6.

The invention as has just been described is not limited to the means and configurations exclusively described for a particular embodiment, and also applies to all combinations of these means or configurations, as well as to equivalents and to any combination of such means or configurations with the equivalents.

The invention claimed is:

1. A heating, ventilation and/or air-conditioning (HVAC) device for a motor vehicle, the HVAC device comprising:
   a housing of elongate shape comprising a lower surface defining a flow channel for an air flow;
   a first heat exchanger:
   arranged in the flow channel, and
   inscribed in a first plane;
   a second heat exchanger:
   arranged in the flow channel, and
   inscribed in a second plane;
   wherein an angle between the first plane and the second plane is between 90° and 120°;

a bypass path of the second heat exchanger;

a first air outlet duct, a second air outlet duct, and a third air outlet duct, wherein each one of the air outlet ducts is configured to guide the air flow toward different regions of a vehicle passenger compartment;

a single mixing flap comprising a single sliding door, wherein the single mixing flap is arranged in the flow channel and downstream of the first heat exchanger and second heat exchanger;

wherein the single mixing flap is configured to:

translate the single sliding door between a first end position and a second end position, close the bypass path, that is confined by the first heat exchanger, while the single sliding door is at the first end position, and close the second heat exchanger while the single sliding door is at the second end position;

a second distribution flap comprising a sliding door configured to:

translate between a first end position and a second end position, close an inlet mouth of the second air outlet duct while the sliding door is at the first end position, and allow a flow of cold air from a mixing chamber while the sliding door is at the second end position;

wherein the third air outlet duct comprises an inlet mouth arranged at a level of the mixing chamber in which hot and cold air are mixed;

wherein a blower, the first heat exchanger, and the second heat exchanger are aligned in a transverse axis of said housing;

wherein the first heat exchanger and the second heat exchanger are aligned in a longitudinal axis of said housing;

wherein the lower surface of the housing defines the flow channel and the third air outlet duct; and wherein the third air outlet duct is further defined by an external wall and directs the air flow from the mixing chamber to a bulkhead of the motor vehicle, and wherein the single sliding door is substantially parallel to the second heat exchanger at the second end position.

2. The HVAC device as claimed in claim 1, wherein the second distribution flap is configured to guide the air flow toward a ventilation nozzle.

3. The HVAC device as claimed in claim 1, further comprising a first distribution flap comprising a flag-type flap configured to at least partially close the first air outlet duct.

4. The HVAC device as claimed in claim 3, wherein the third air outlet duct is configured to guide an air flow toward a feet nozzle.

5. The HVAC device as claimed in claim 1, further comprising a third distribution flap comprising a butterfly-type flap configured to at least partially close the third air outlet duct.

6. The HVAC device as claimed in claim 5, wherein the first air outlet duct is configured to guide an air flow toward a defrost nozzle.

7. The HVAC device as claimed in claim 1, wherein the second heat exchanger is substantially horizontal in the vehicle.

8. The HVAC device as claimed in claim 1, wherein the housing comprises an outside air inlet and a recycling air inlet.

* * * * *